Nov. 27, 1962

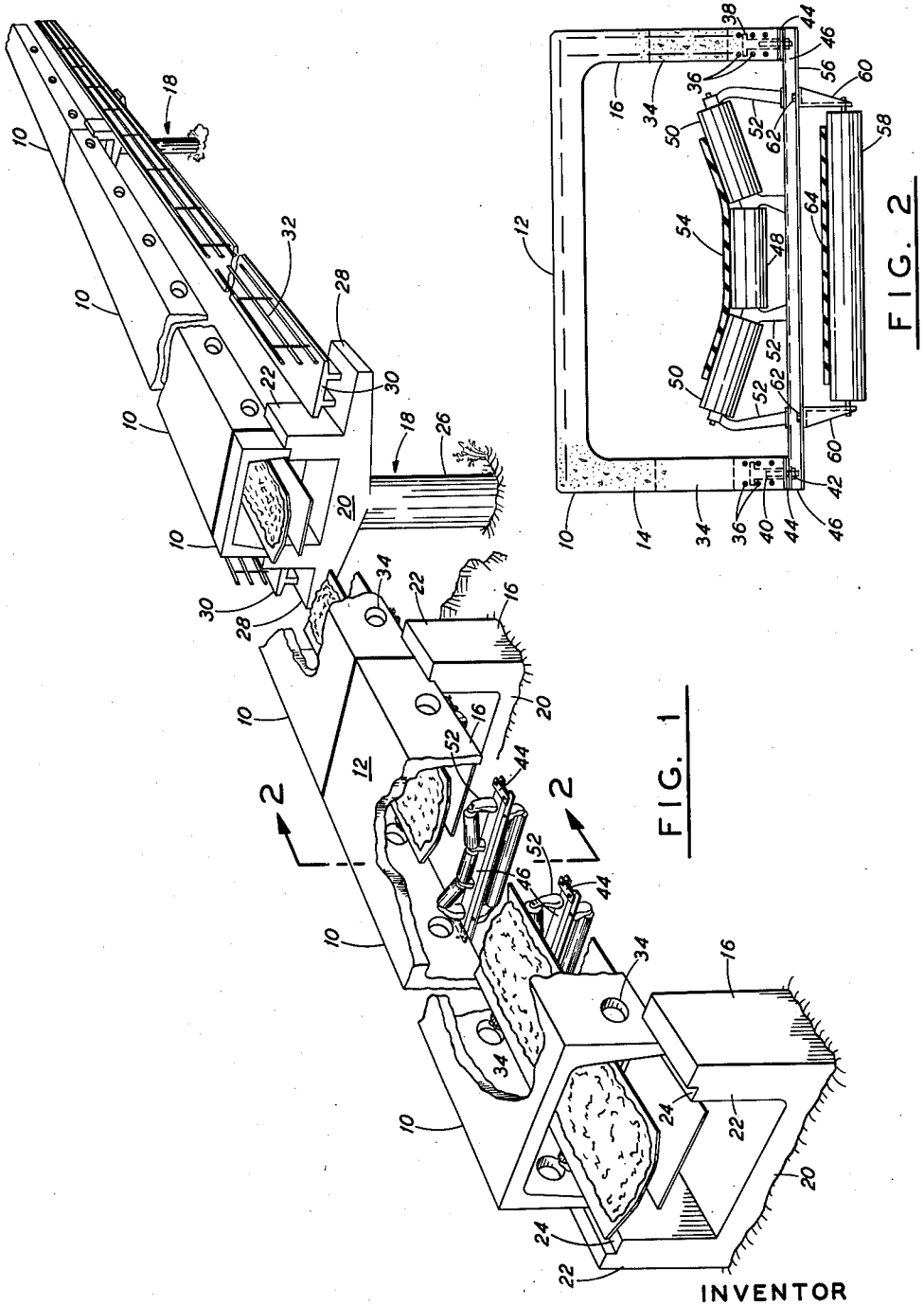

F. J. MADISON 3,065,843

MATERIAL HANDLING CONVEYOR

Filed June 3, 1960

INVENTOR
FRANK J. MADISON

BY *Naylor & Neal*
ATTORNEYS

United States Patent Office 3,065,843
Patented Nov. 27, 1962

3,065,843
MATERIAL HANDLING CONVEYOR
Frank J. Madison, 607 Market St., Palo Alto, Calif.
Filed June 3, 1960, Ser. No. 33,727
2 Claims. (Cl. 198—204)

This invention relates to material handling belt conveyors and more specifically to such conveyors which are employed for relatively long distance transportation of bulk materials over land and water.

It is a principal object of this invention to provide a durable and relatively permanent belt conveyor for long distance transportation of bulk materials in which the conveyor may be erected as inexpensively as possible.

It is another object of this invention to provide such a conveyor having improved means for facilitating inspection and maintenance of the conveyor.

It is another object of the invention to provide such a conveyor in which the moving parts of the conveyor and the material conveyed thereby will at all times be protected from the elements.

It is a more specific object of this invention to provide such a conveyor made of a plurality of repetitive units in order that construction of the conveyor may be accomplished with a minimum number of forms and in order that maintenance of the conveyor may be accomplished with a minimum number of spare parts.

Other objects and advantages of the present invention will become apparent from the following description read in conjunction with the attached drawings in which:

FIG. 1 is a perspective view of the conveyor of this invention with parts thereof broken away to illustrate the interior structure of the conveyor, and different portions of the conveyor employed in different terrains;

FIG. 2 is a cross-sectional view of the conveyor of FIG. 1 taken in the direction indicated at 2—2 in FIG. 1;

Figures 3, 4:
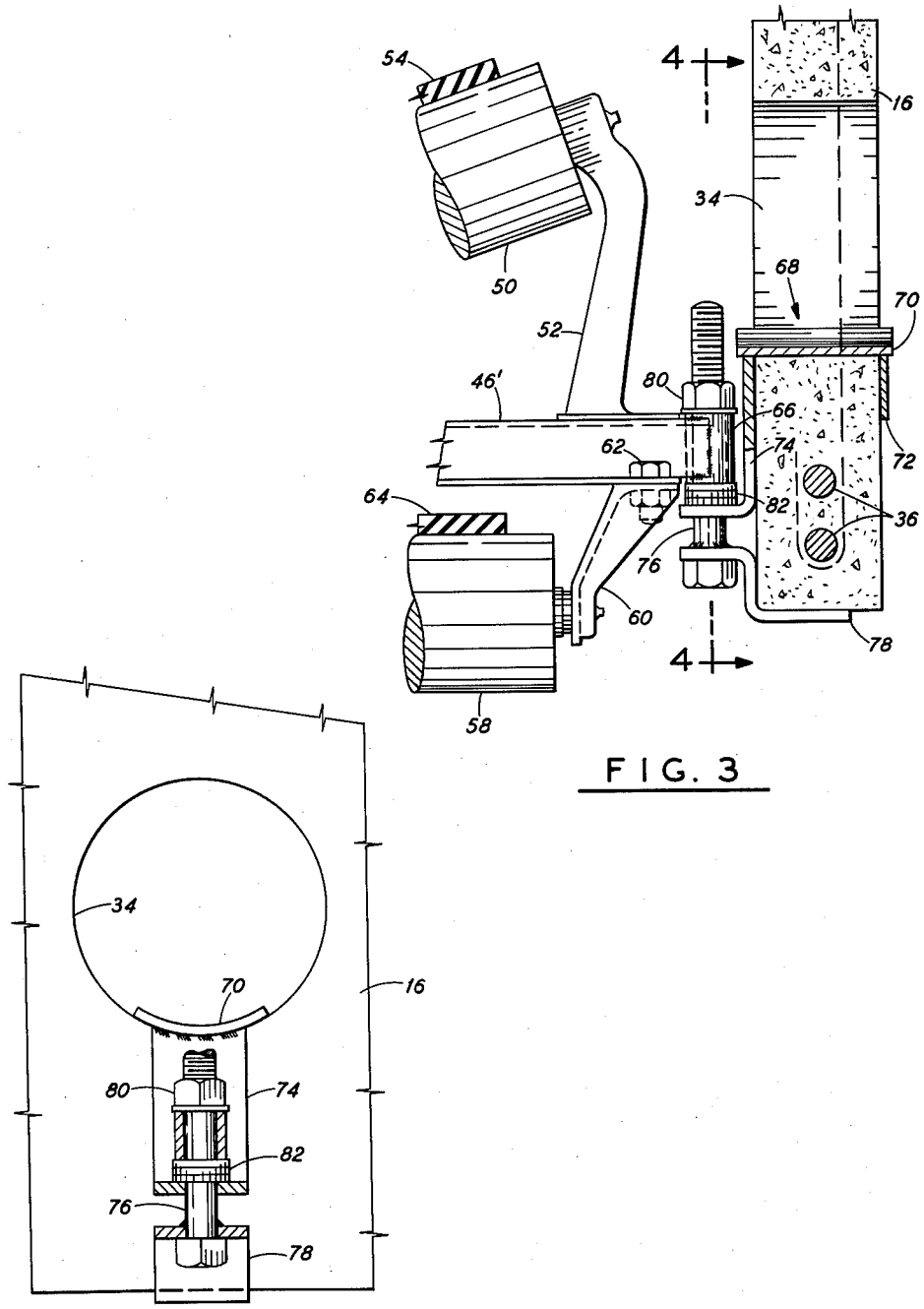
FIG. 3 is a cross-sectional view similar to FIG. 2 illustrating a fragment of a preferred form of conveyor of this invention.
FIG. 4 is a sectional view of the apparatus of FIG. 3 taken along the plane indicated at 4—4 in FIG. 3.

Broadly stated this invention comprises a material handling conveyor comprising a reinforced concrete conveyor housing having a top wall and two side walls and being open at the bottom, means for supporting said housing above the ground, a plurality idler support frames removably secured to said housing adjacent to the bottoms of said side walls, upper conveyor support idlers mounted on the tops of said frames and extending between said side walls, lower conveyor support idlers removably connected to said frames and supported thereby below said frames, an endless conveyor belt having an upper course supported by said upper idlers and a lower course supported by said lower idlers, and an idler inspection port in one of said side walls adjacent to each of said frames.

Referring now in detail to the drawings and particularly to FIGS. 1 and 2, the conveyor illustrated therein comprises a plurality of elongated conveyor housing sections 10 made of reinforced concrete. All of the housing sections 10 are identical to each other and may be cast from the same mold, each housing section 10 having a top wall 12 and two side walls 14 and 16.

The conveyor housing sections 10 are aligned with each other in end-to-end relationship and are supported above the ground by pedestals 16 and 18. Each of the pedestals 16 and 18 includes a concrete base portion 20 and two side columns 22 which are provided with a groove 24 in the top thereof on which the adjacent ends of adjacent housing sections 10 rest.

As illustrated in FIG. 1 the pedestals 16 are employed in terrain where the conveyor is supported close to the ground level, and the pedestals 18 are employed in terrain where the conveyor is supported substantially above the ground. Thus, in addition to the elements present in the pedestals 16, the pedestals 18 are provided with a vertical column 26 on which the pedestal base 20 is mounted, and a pair of lateral shoulders 28 are provided on each of the pedestals 18. A pair of concrete walkways 30 are supported on either side of housing sections 10 by the shoulder 28 of adjacent pedestals 18, and each walkway is provided with a guard railing 32 on the outer side thereof.

A plurality of idler roller inspection ports 34 are provided in the side walls 14 and 16 of the conveyor housing sections 10. The inspection ports 34 are positioned so that a maintenance man may look through them when he is standing on the ground adjacent to pedestals 16 or when he is standing on a walkway 30 adjacent to the pedestals 18.

As illustrated in FIG. 2, the housing sections 10 are constructed of reinforced concrete employing steel reinforcing rods 36, and a plurality of flanged stud receiving sockets 38 are imbedded in the sidewalls 14 and 16 adjacent to the bottom thereof. A threaded stud 40 is received in each socket 38 and carries a nut 42 on the lower end thereof supporting a bracket 44 which is mounted on the end of a conveyor frame supported member 46. A support bracket 44 is provided on each end of the frame members 46 and is bolted to the housing sections 10 by means of two of the bolts 42. A horizontal conveyor belt idler 48 and two inclined conveyor belt idlers 50 are supported on suitable axles above each of the frames 46 by means of brackets 52. The idlers 48 and 50 support the upper course 54 of an endless conveyor belt in the shape of a trough for the transportation of bulk materials.

The lower edges of frame member 46 are provided with laterally extending flanges 56, and a lower conveyor belt supporting idler 58 is removable supported below frame members 46 by means of brackets 60 which are bolted to the flanges 56 by means of bolts 62. The lower conveyor belt idlers 58 support the lower course 64 of the endless conveyor belt.

In this manner the endless conveyor belt is supported by a plurality of idler units, each unit being identical with the group of idlers and support members illustrated in FIG. 2. The above-mentioned idler inspection ports 34 are positioned along the length of housing sections 10 so that an inspection port 34 is positioned adjacent to each end of each idler unit illustrated in FIG. 2.

Of course the conveyor belt is driven by a suitable power source which, since it forms no part of this invention is not illustrated in the drawings.

FIGS. 3 and 4 illustrate a preferred arrangement for attaching the conveyor belt idler rollers to the side walls 16 of the conveyor housing. In this arrangement the idler supporting frames 46' are sufficiently shorter than the frames 46 of FIGS. 1 and 2 to permit the mounting of the frames 46' between the side walls 16 of the conveyor, and each of the frames 46' is provided with an upright cylindrical collar 66 welded to each end thereof.

A mounting bracket 68 is provided in each of the inspection ports 34 of the housing for supporting the idler frames 46'. Each of the brackets 68 has a central curved portion 70 which rests on the lower part of the periphery of the port 34 and an exterior flange 72 which holds the bracket against movement into the housing. The inner edge of the bracket portion 70 carries a flanged leg 74 depending therefrom and embracing the inner side of the housing wall 16. The leg 74 is provided with an aperture therethrough for the receipt of a bolt 76 carried by a bracket 78 which embraces the bottom of the housing wall 16.

The bolts 76 extend through the collars 66 on the frames 46' and are held in place by nuts 80. A plurality of shims 82 are provided between the collar 66 and the flange on the leg 74 to permit accurate vertical positioning of the frames 46'. It may be desirable to make the collar 66 oblong in shape to provide horizontal adjustment.

It should be noted that it is desirable to provide a coating of rubber sealant or the like where the bracket portion 70 rests on the side wall 16 at the lower edge of the inspection port 34.

Accordingly, it will thus be seen that the conveyor of this invention may be constructed very economically since all of the conveyor housing sections 10 may be cast from the same form, and since the same form may be used for casting all of the bases 20 of the supporting pedestals 16 and 18 for the conveyor; one additional form is necessary to cast the column and side shoulders for the pedestals 18, and a single form may be employed for casting the walkways 30. Not only is construction of the concrete parts of the conveyor facilitated by the use of a small number of forms but in addition the use of identical units of belt supporting idlers permits the construction of the conveyor from minimum number of different parts.

The use of the mounting brackets 68 illustrated in FIGS. 3 and 4 eliminates the necessity of providing aligned stud receiving sockets 38 in the housing when the housing is cast and employs the alignment of the ports 34 for mounting the idler frames. The brackets 68 may be easily inserted in the ports 34 after the housing has been cast.

The conveyor of this invention is particularly adapted for simple inspection and maintenance. A conveyor inspector may walk along the ground adjacent to pedestals 16 or may walk along the walkway 30 on pedestals 18 and look through the idler inspection ports 34 to determine if any of the conveyor idlers have become frozen. When upon such inspection he determines that repair of one group of idlers is necessary, the repair may be accomplished without interrupting operation of the conveyor. Thus, repair of the idlers may be accomplished by removing bolts 62 and lowering the idler 58 followed by removal of bolts 42 (or the bolts 76 in FIGS. 3 and 4) and withdrawal of the frame 46 and upper idler rollers 48 and 50 from between courses of the conveyor. The units of upper and lower idler rollers are provided at sufficient intervals along the length of the conveyor that one unit may be temporarily removed without interrupting operation of the conveyor, the upper and lower courses of the conveyor being supported by the adjacent units of idler rollers. After the inspector has repaired or replaced the frozen idler which he has removed, the idler unit may be returned to its position by reversing the procedure outlined above.

While certain specific embodiments of the invention have been illustrated in the drawings and described above, it is to be understood that many modifications in the construction shown may be employed without departing from the spirit and scope of the invention. Accordingly, the invention is defined by the following claims.

I claim:

1. In a material handling conveyor having a plurality of elongated reinforced concrete housing sections aligned with each other in end-to-end relationship, each of said sections having a top wall and two side walls and being open at the bottom thereof, a plurality of pedestals for supporting said housing sections above the ground, and an endless conveyor belt supported by said housing and having an upper course and a lower course, the improved means for supporting said belt and facilitating maintenance of said conveyor comprising a plurality of idler inspection ports in each of said side walls said ports being arranged in aligned pairs along the length of said housing, a conveyor support bracket removably mounted in each of said ports and embracing the side wall of said housing along the lower portion of the periphery of said port, a conveyor idler support frame removably connected to said brackets in each pair of ports, upper conveyor support idlers mounted on the tops of said frames and supporting said upper course of said belt, and lower conveyor support idlers removably connected to said frames and supporting said lower course of said belt below said frames.

2. A material handling conveyor comprising a reinforced concrete housing having a top wall and two side walls, means for supporting said housing above the ground, a plurality of pairs of idler inspection ports spaced longitudinally of said housing, one port of each pair extending through each side wall and generally in alignment with the other port of said pair, an idler support bracket extending through each of said ports, a plurality of sets of upper and lower conveyor belt support idlers positioned between said side walls and removably connected to said brackets in said pairs of ports, and an endless conveyor belt extending over said pairs of idlers.

References Cited in the file of this patent

UNITED STATES PATENTS

| | | |
|---|---|---|
| 1,987,517 | Portor et al. | Jan 8, 1935 |
| 2,249,588 | Waddle | July 15, 1941 |
| 2,260,812 | Kozak | Oct. 28, 1941 |
| 2,644,572 | Mercier | July 7, 1953 |
| 2,900,070 | Sharp | Aug. 18, 1959 |